(12) United States Patent
Sugiura (10) Patent No.: US 8,405,851 B2
(45) Date of Patent: Mar. 26, 2013

(54) IMAGE READING SYSTEM, AN IMAGE READING APPARATUS AND A METHOD FOR CONTROLLING THE IMAGE READING APPARATUS

(75) Inventor: Hiroaki Sugiura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 12/361,325

(22) Filed: Jan. 28, 2009

(65) Prior Publication Data
US 2009/0190185 A1    Jul. 30, 2009

(30) Foreign Application Priority Data

Jan. 29, 2008   (JP) ................................. 2008-017081

(51) Int. Cl.
*G06F 3/12* (2006.01)
(52) U.S. Cl. ........ 358/1.15; 358/1.2; 358/505; 358/405; 358/426.04; 358/451; 345/538; 709/247; 709/232
(58) Field of Classification Search .................... 358/1.1, 358/1.2, 1.15, 1.16, 505, 405, 426.04, 451, 358/474; 345/660, 538, 555; 709/246, 232, 709/203
See application file for complete search history.

(56) References Cited

U.S. PATENT DOCUMENTS

| 6,332,146 | B1 * | 12/2001 | Jebens et al. ........................... 1/1 |
| 2001/0026376 | A1 * | 10/2001 | I'Anson ........................ 358/400 |
| 2002/0087728 | A1 * | 7/2002 | Deshpande et al. .......... 709/246 |
| 2005/0168763 | A1 * | 8/2005 | Higuchi et al. .............. 358/1.13 |

FOREIGN PATENT DOCUMENTS

| JP | 11-205517 A | 7/1999 |
| JP | 11-317833 A | 11/1999 |

* cited by examiner

*Primary Examiner* — King Poon
*Assistant Examiner* — Jamares Q Washington
(74) *Attorney, Agent, or Firm* — Canon USA, Inc. IP Division (57) ABSTRACT

An image reading apparatus configured to read a document at a second resolution based on a result of reading the document at a first resolution generates image data with low data amount having small data amount from image data-for-save that has been read at the second resolution and transfers the image data with low data amount taking priority over the image data-for-save to an image processing apparatus. The image processing apparatus is configured to notify a user that next reading processing is acceptable when receiving of the image data with low data amount is completed. The image processing apparatus is configured to receive and store the image data-for-save according to the next reading processing instructed by the user.

10 Claims, 9 Drawing Sheets

IMAGE READING SYSTEM, AN IMAGE READING APPARATUS AND A METHOD FOR CONTROLLING THE IMAGE READING APPARATUS

BACKGROUND OF THE INVENTION

1. Field of the Invention

The present invention relates to an image reading apparatus and image reading method. More particularly, the present invention relates to an image reading apparatus and image reading method that enables image data to be input via a relatively low-rate communication channel such as a wireless communication network.

2. Description of the Related Art

In recent years, in place of a printer that can be used only for printing, a multifunctional peripheral (MFP) integrating a function of scanner with a printer has come into wide use. Such an MFP may be connected to an apparatus that can execute image processing, such as a personal computer (PC) and the like, to execute reading of a high-resolution full-color image. In addition, since the MFP can be used also as an independent apparatus, such as a copying machine or a facsimile machine, that does not need to be connected to a PC, there is also a strong demand for installing MFPs at locations away from a PC rather than near a PC. For these and other reasons, it is expected that the cases requiring a high degree of freedom of installation will increase. As a substitute for connection that enables a high-speed data transfer by means of cables suitable for data transfer in close-range such as SCSI, IEEE1394, and USB2.0, which are conventionally used for connection between PCs and image reading apparatuses, it is expected that cases will increase in which a wireless local-area network (LAN) represented by IEEE802.11a/b/g, electric power line communication (PLC), and the like will be used for connections between image reading apparatus and PCs.

However, these wireless connection methods have lower data transfer rates than many conventional wired methods. On the other hand, the resolution of an image to be read has become higher as the performance of image reading apparatuses has increased, and thus the amount of image data to be transmitted tends to increase. For instance, when a full-color image (RGB 24 bits) in A4 size is read at 600 dpi, the amount of non-compressed data reaches nearly 100 M bytes. USB2.0 (which typically has transfer rate of about ten to fifteen M bytes per second (10-15 MB/s)) is now widely used for connection of a scanner or an MFP to a computer. USB2.0 typically can transfer 100 M bytes in a few seconds. Thus, using USB2.0, the transfer of a 100 M byte image is completed substantially at the same time as the completion of the reading operation. However, in wireless LAN (which typically has a transfer rate of a few MB/s), approximately 100 seconds is required for data transfer.

Since the reading operation of the image reading apparatus is completed in about 20 seconds, users have to wait until the data transfer is completed for a few tens of seconds even after the reading operation has been completed. Also, although the length of time which a user has to wait for a single image may be acceptable to the user, for a plurality of images to be scanned sequentially, the waiting time increases in rough proportion to the number of images, which raises a problem that the user has to wait for a long time to receive the desired images. Frequently, the time needed to transfer image data winds up being wasted by the user as it is difficult to switch back and forth between tasks.

Thus, in an existing image reading system that is supposed to employ a connection form that can perform a high-rate communication, it is difficult to provide a comfortable image reading function to a user in an image reading system that is connected via a low-rate communication channel. In connection forms in which scanned image data with such huge-volumes of data needs to pass by way of a communication channel with a low data transfer rate, several methods to improve the efficiency of image reading jobs and to provide a user-friendly system have been proposed.

For example, in a system where a PC and an image reading apparatus are connected via a network, image data that an image reading apparatus has read is stored in an image server. Then, the PC firstly acquires thumbnail images with small data amount that is stored in the image server, and subsequently acquires, from the image server, only read image data of desired images. Japanese Patent Application Laid-Open No. 11-317833 discusses a technique to reduce the amount of data to be transferred to a PC with such an operation. Also, in a system to which large-capacity external storage devices are connected, that can directly read and write data via IEEE1394, etc., from the PC and the image reading apparatus, read image data is directly transferred from the image reading apparatus to an external storage device, and only a part of the read image data is transferred to the PC. Japanese Patent Application Laid-Open No. 11-205517 discusses a technique to reduce the amount of data to be transferred to a PC with such an operation.

However, techniques discussed at present have not yet solved image data transfer problems for users. These techniques require users to make different operations from that of image reading jobs commonly performed at present. Further, it is difficult to perform optimal image processing for acquiring high-quality read images. In general, in a reading job, first, a preview is executed of an image that has been read at a first resolution to read an image for grasping the overview of readable images. Image data to be read in the preview typically is of low resolution so that the preview can be displayed more quickly on a display device, such as a CRT or a liquid crystal monitor, provided in an image processing apparatus such as a PC.

For this reason, the number of pixels of 600 to 900 in the vertical and horizontal directions of the preview image respectively, or approximately 2 M bytes in terms of data amount is enough, and even if a connection form between a PC and an MFP is a low-rate communication channel, substantially no problems occurs. Users select and adjust, while viewing a displayed preview image, the range of image reading for save and image processing to be performed on the read image, which are the final objects of the processing. By selecting and adjusting such image processing, images that have been subjected to selected/adjusted image processing, with respect to the preview image, can be displayed on the display device.

Then, after the selected and adjusted image is confirmed by viewing the preview image, final image reading is instructed, and image data that has been read at a second resolution that is generally higher than a first resolution will be saved as a designated file. Hereinafter, image data that has been read in this manner is referred to as "image data-for-save". Lossy compression can be applied to the image data-for-save, but in many cases, lossless compression (compression without losses of information) is applied thereto. Even when the lossy compression is applied to the image data-for-save, a suppressed compression ratio is employed to keep the quality of the image data high.

By performing such a process, reading only an image within a designated reading range is sufficient for the image reading apparatus, and consequently a time required for the reading operation can be reduced to the requisite minimum. Also, after confirming the effect by viewing the preview image, a suitable image processing can be applied to the images for save. In image processing that is applied to the images for save, there is processing that should be performed in an image reading apparatus and processing that is suitably performed in an image processing apparatus. For example, it is suitable to perform such processing that is needed to be performed by using information that an image sensor has read, such as color shift correction, in the image reading apparatus. On the other hand, it is suitable to perform such processing that will need a large amount of memory and a central processing unit (CPU) of high speed, such as automatic color correction, in an image processing apparatus such as a PC. In the conventional process, it is possible to perform various image processes image reading apparatus and others in the image processing apparatus.

However, in the techniques discussed in Japanese Patent Application Laid-Open No. 11-317833, a read image is saved in a server or an external storage device, and a thumbnail image of the read image or a part of the image is transmitted to a PC. Conventionally, it is neither possible to select a reading area using the displayed thumbnail image or a part of the image, nor to select/adjust image processing to be applied to the read-image. Also, in the technique discussed in Japanese Patent Application Laid-Open No. 11-317833, users need to be conscious of whether an image reading apparatus is directly connected to an image processing apparatus or rather connected via a network. Different operations are performed depending on whether the network is used. For example, in connection via the network, users have to conduct an operation on a PC to acquire desired image data stored in an image server, that is, an operation that is not needed in direct connection. In addition, in the technique discussed in Japanese Patent Application Laid-Open No. 11-205517, image data that has been read is transferred from an image reading apparatus via IEEE1394 to an external storage device, and image data that has been read is not even transferred to a PC. Because the PC does not receive such image data, an image processing that needs a large amount of memory and a high speed CPU, such as automatic color correction, for example, cannot readily be performed.

Compressing a read image for save using a method, which can reduce data amount considerably, such as JPEG, may be available. However, the compression methods which can reduce the data amount sufficiently are lossy, in which the original complete image cannot be decompressed, and thus unsuitable when a high-quality read image is desired. On the other hand, in a lossless compression, in which a complete image can be decompressed, although some images can be heavily compressed, there are no techniques for adequately reducing the data amount suitable for the wide variety of images that most users need to be able to process.

SUMMARY OF THE INVENTION

According to an aspect of the present invention, an image reading system includes an image reading apparatus configured to read a document at a second resolution according to an instruction by a user based on a result of reading the document at a first resolution and an image processing apparatus. The image reading apparatus includes a reading image data storage unit configured to store image data that is read at the second resolution as image data-for-save, a generation unit configured to generate (from the image data-for-save) image data with low data amount having smaller data amount than the image data-for-save, and a transfer unit configured to transfer the image data with low data amount with priority over the image data-for-save to the image processing apparatus. The image processing apparatus includes a receiving unit configured to receive the image data with low data amount and the image data-for-save, a notification unit configured to notify a user that a reading instruction at the first resolution is acceptable, on completion of receiving the image data with low data amount, an enabling unit configured to enable acceptance for the reading instruction at the first resolution, when the receiving of the image data with low data amount is completed, a sending unit configured to send a reading instruction to the image reading apparatus in response to a reading instruction by a user, and an image data-for-save storage unit configured to store the image data-for-save to be received when the operation of the reading instruction at the first resolution is performed.

According to exemplary embodiments of the present invention, even if connection between a PC and an image reading apparatus is at a low data transfer rate, users can execute a high-speed reading operation without stress in operating environment. Also, the embodiments provide an effect that a PC and an image reading apparatus can share the role of image processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the instruction, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 2:
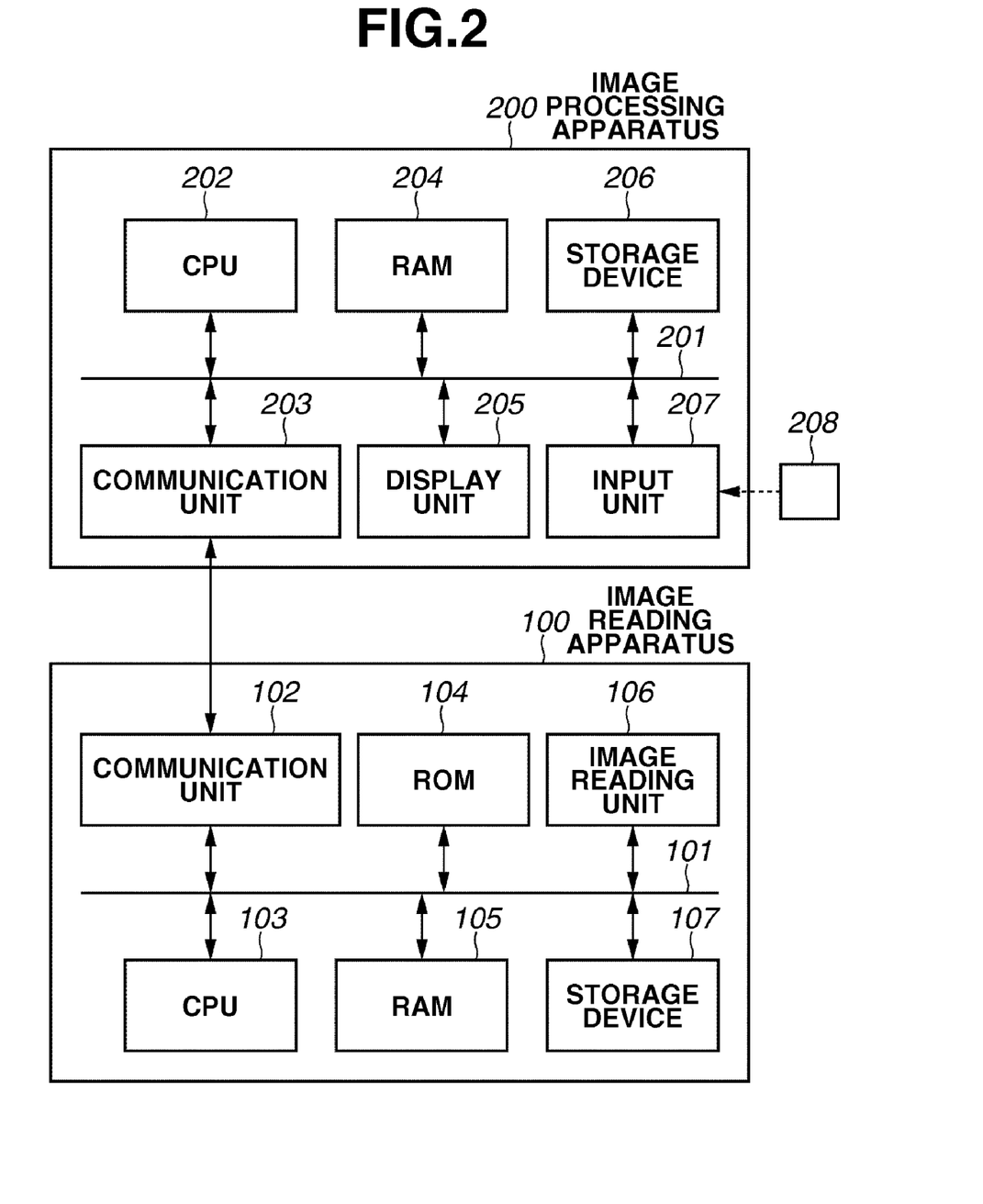
FIG. 2 is a block diagram illustrating a configuration example of hardware for realizing the image reading apparatus and the image processing apparatus according to a first exemplary embodiment of the present invention using software.

FIG. 2 is a block diagram illustrating a hardware configuration example of an image reading system according to a first exemplary embodiment of the present invention. The image reading system includes an image reading apparatus 100 and an image processing apparatus 200. In the present embodiment, the image processing apparatus 200 is implemented using software configured to run on a PC, Mac, or other computer system, and components thereof communicate with each other via a bus 201. The image processing apparatus 200 has a CPU 202, a communication unit 203, a random access memory (RAM) 204, a display unit 205, a storage device 206, and an input unit 207.

The CPU 202 is a controller that controls operation of the image processing apparatus 200 in accordance with a control program stored in the RAM 204. The input unit 207 is an input/output device including various instruction input devices, such as a keyboard and a mouse. The RAM 204 stores programs (including the control program), which correspond to the flowcharts of FIGS. 4, 5, and optionally 8 described below. In addition, the RAM 204 stores various data used by the CPU 202 in executing the programs. The programs can also be stored in an external storage medium 208, such as a compact disc read only memory (CD-ROM) or a floppy disk (FD), and installed therefrom in an internal storage device 206. The internal storage device 206 is a nonvolatile storage device including a large-capacity memory, such as a hard disk drive or the like, and stores image data in addition to the programs. The internal storage device 206 can also store other application programs and other data used by the CPU 202. A display unit 205 is a display device such as a flat panel monitor, cathode ray tube (CRT) monitor, rear projection display, or the like. The display unit 205 is used to display images and other data processed by the CPU 202.

The image reading apparatus 100 includes a communication unit 102, a CPU 103, a ROM 104, a RAM 105, an image reading unit 106, and an internal storage device 107, which communicate with each other via a bus 201. The CPU 103 is a controller that controls operation of the image reading apparatus 100 according to a control program stored either in the ROM 104, the RAM 105, or both. The ROM 104 is a nonrewritable and nonvolatile storage device, and the RAM 105 is a rewritable volatile storage device. The control program and other programming executed by CPU 103 correspond to various flowcharts (FIGS. 6, 7, and optionally FIG. 9 as well) described below. The RAM 105 also stores various data used by the CPU 103 in executing the programs. The storage device 107 is a nonvolatile storage device equipped with a large-capacity memory such as hard disk drive, and stores image data and other data in addition to the programs executed by the CPU 103.

The image reading unit 106 includes an image sensor, such as a charge-coupled device (CCD) or a contact image sensor (CIS), to read a document, and it 106 performs necessary image processing to convert the document into image data.

The image processing apparatus 200 and the image reading apparatus 100 include a communication unit 203 and a communication unit 102 respectively, via which they can communicate bi-directionally with each other. The image reading unit 106 is configured to read images. The storage device 107 is configured to store image data that has been read. The CPU 103 and the ROM 104 constitute a low-data-amount image data generation unit for generating (from an image data-for-save) a low amount image data having less data than that of the image data-for-save.

The communication unit 102 is a low-data-amount image data transfer unit that transfers the image data with low data amount with priority over the image data-for-save to the image processing apparatus. Also, the communication unit 203 is a reading operation completion notification unit that notifies a user that a reading instruction is acceptable when transfer of the image data with low data amount is completed. The CPU 202 is a reading instruction acceptance enabling unit that enables acceptance of the reading instruction when transfer of image data with low data amount is completed.

The display unit 205 is a display unit that displays the image data with low data amount for confirming the reading image. The CPU 202 and the program stored on the RAM 204 is an example of a display scaling factor specifying unit. The display unit 205 displays an enlarged image of the image data for confirming the reading image indicated by the user through the display scaling factor specifying unit.

The communication unit 102 is an image-data-for-save transfer unit that transfers a part of the image data-for-save, taking priority over the remainder of the image data-for-save, necessary for display in response to an instruction about a display scaling by the display scaling factor specifying unit.

The communication unit 203 is also a reading instruction sending unit that sends a reading instruction in response to a user's reading instruction. The communication unit 203 is also an image data-for-save receiving unit that receives the image data-for-save. The storage device 206 is an image-data-for-save storage device that stores the received image data-for-save while the receiving operation is performed. In addition, the notification that the reading instruction is acceptable is to display a save destination specifying dialog of the image data-for-save. Further, notification that a reading instruction is acceptable to the notification unit is a display of a notification-specific dialog.

Figure 3:
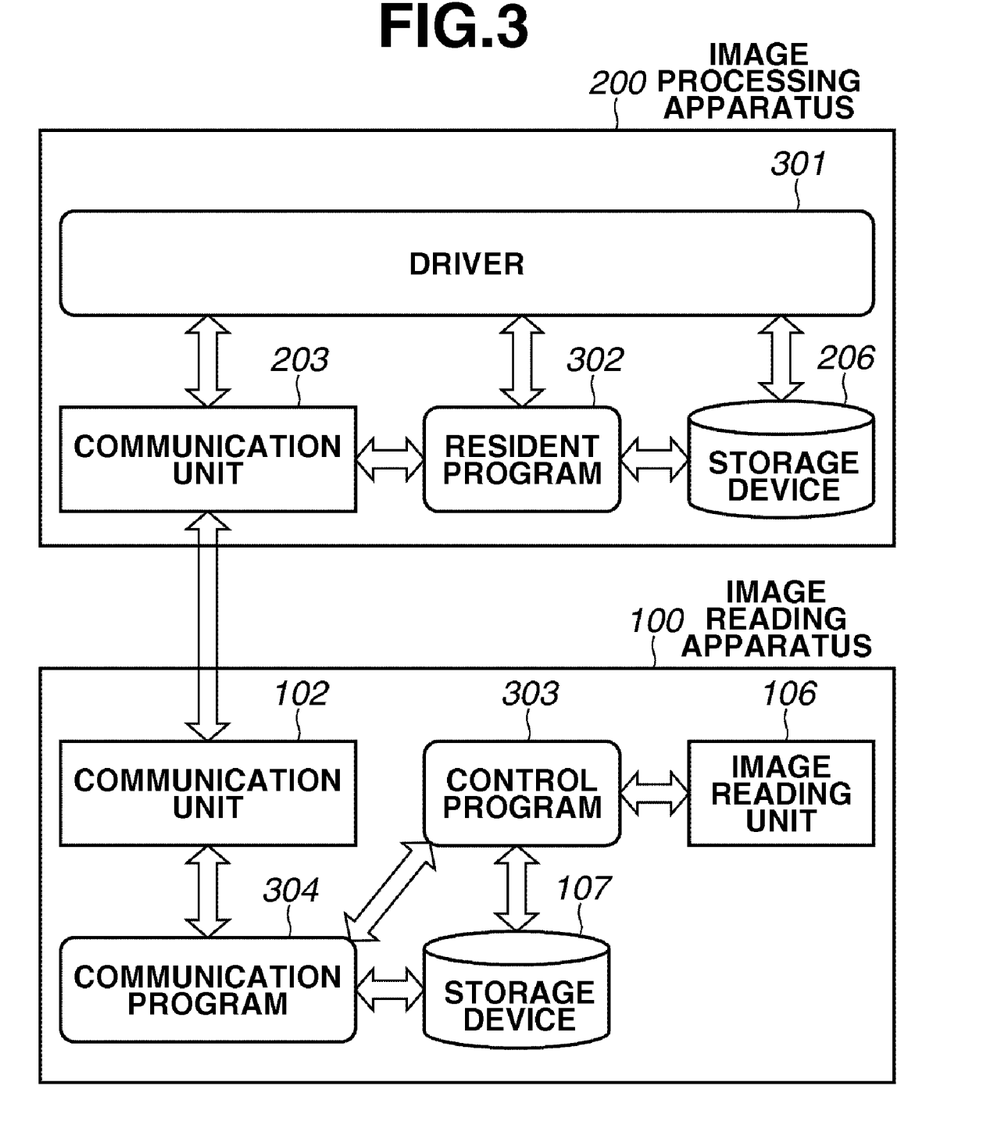
FIG. 3 is a block diagram illustrating exchange of data between programs, and between the hardware and programs, when the image reading apparatus and the image processing apparatus are configured using software according to the first exemplary embodiment.

Next, in the first exemplary embodiment, a user's operation and an overview of processing performed in response to the user's operation by the image processing apparatus 200 and the image reading apparatus 100 will be described. FIG. 3 is a block diagram illustrating an example of exchanging data between programs and between apparatuses when an image reading apparatus 100 and an image processing apparatus 200 are configured using software, according to the first exemplary embodiment. A user performs a preview (performs image reading with low resolution) to confirm the effect when the reading range instruction and various image processing are applied to the image data, usually before performing final image reading. For a resolution for displaying on the display unit 205 of the image processing apparatus, if the image is A4 size, typically 72 to 100 dpi is designated. That resolution is enough and suitable for the preview displaying.

A driver 301 that operates on the image processing apparatus 200 sets and executes various processes for the image reading apparatus 100 and image data that has been read out. In these processes, image processing (e.g., automatic color correction), which is better performed by a PC on the image data output from the image reading apparatus 100, is included. When a user instructs the driver 301 to execute preview reading, the driver 301 transmits a preview reading command to the image reading apparatus 100. In the image reading apparatus 100, when a control program 303 discriminates the preview reading command, the control program 303 causes an image reading unit 106 to operate, and the control program 303 transmits image data that has been read, while executing image reading, via the communication unit 102 to the image processing apparatus 200 as preview image data.

In the image processing apparatus 200, the driver 301 receives preview image data via a resident program 302, and displays the preview image data on a preview image display area of the display unit 205. A user determines and sets, referring to the preview image, a reading range and image processing to be executed. Then, the user instructs reading-for-save to the driver 301. The driver 301 sends a reading-for-save command to the image reading apparatus 100, in accordance with the reading-for-save instruction by the user. In the image reading apparatus 100, the control program 303 causes the image reading unit 106 to operate in accordance with the reading-for-save command. The control program 303 causes the image reading unit 106 to execute image reading with a resolution for save with a higher resolution than a resolution for preview. At the same time, the control program 303 performs the following processing for each band including a predetermined raster number.

First, the control program 303 stores the read image data-for-save in the storage device 107. In addition, the control program 303 transfers image data with low data amount generated based on the read image data-for-save to the image processing apparatus 200. An "image data with low data amount" is image data obtained by converting the image data-for-save in order to reduce data amount. The image data with low data amount is transmitted to the image processing apparatus 200 to display on the display unit 205 of the image processing apparatus 200. It is desirable to set data amount of the image with low data amount at data amount of which the transfer will be completed in substantially the same amount of time as that required for a reading operation of the image reading unit 106. For this reason, data amount of the image with low data amount can be determined by multiplying data amount per time, which is set uniquely depending on a connection configuration between the image reading apparatus 100 and the image processing apparatus 200, by the time required for the reading operation.

Further, it would be better if an actual data transfer rate between the image reading apparatus 100 and the image processing apparatus 200 is measured to determine a data amount of image with low data amount based on the measured transfer rate. Also, a lossy compression, such as JPEG compression, in which data amount can be adjusted according to the need, is suitable for the compression method for the image data with low data amount. In addition, it is suitable to reduce the number of pixels of image data with low data amount to be approximately one-half to one third, in vertical and horizontal directions, of the number of pixels of image for save. In other words, if the number of pixels of image for save is not reduced, the compression ratio must be made higher, and as a result, image deterioration increases and results in an unsuitable quality for displaying. When reducing the number of pixels, pixels can be simply thinned out. However, if the number of pixels is reduced after taking an average, for example, by passing through a low-pass filter, images will be more suitable for display.

The driver 301 that operates on the image processing apparatus 200, upon the completion of receiving image data with low data amount, informs a user by a reading operation completion notification that the reading operation is completed and that the next reading instruction is acceptable, without waiting for receiving image data-for-save. As methods usable for the reading operation completion notification, there are, for example, the following three methods. A first method for the reading operation completion notification is a method for display a save dialog that allows a user to select a save file of image data-for-save on the display unit 205. A second method for the reading operation completion notification is a method for displaying the image data with low data amount on the display unit 205. A third method for the reading operation completion notification is a method for displaying a notification-specific dialog on the display unit 205.

In the first and third methods for the reading operation completion notification, it is suitable to display the image data with low data amount on the display unit 205 only when there is an instruction from a user. Even without user's instruction, the image data with low data amount can be displayed on the display unit 205 at the same time as the reading operation completion notification. In the second and third methods for the reading operation completion notification, when the driver 301 is finished, a save dialog, which allows a user to select the save file of the image data-for-save, is displayed. Also, in either method, when the save file of image data-for-save is displayed for a user to confirm the image for save, the driver 301 displays the image data with low data amount on the display unit 205.

On the other hand, without waiting for a save instruction of the image data-for-save by a user, along with the start of reading operation, transfer of the image data-for-save from the image reading apparatus 100 to the image processing apparatus 200 is performed by the control program 303 and the resident program 302. The transfer of the image data-for-save by the control program 303 and the resident program 302 is performed as described below. First, a second preview or reading-for-save instruction is given by a user before transfer of the image data-for-save is completed. In such a case, transfer of data of the second preview image or the image with low data amount of the image-for-save is performed taking priority over the transfer of the first image data-for-save. The user recognizes, when the transfer of the image data with low data amount is completed, that all processes are completed. Therefore, even if the transfer of the image data-for-save has not yet been completed, a power source of the image processing apparatus 200 or the image reading apparatus 100 can be switched off. Thus, when the transfer of the image data-for-save is interrupted and communication is enabled, the transfer is resumed to transfer the data that has not been transferred.

Figure 4:
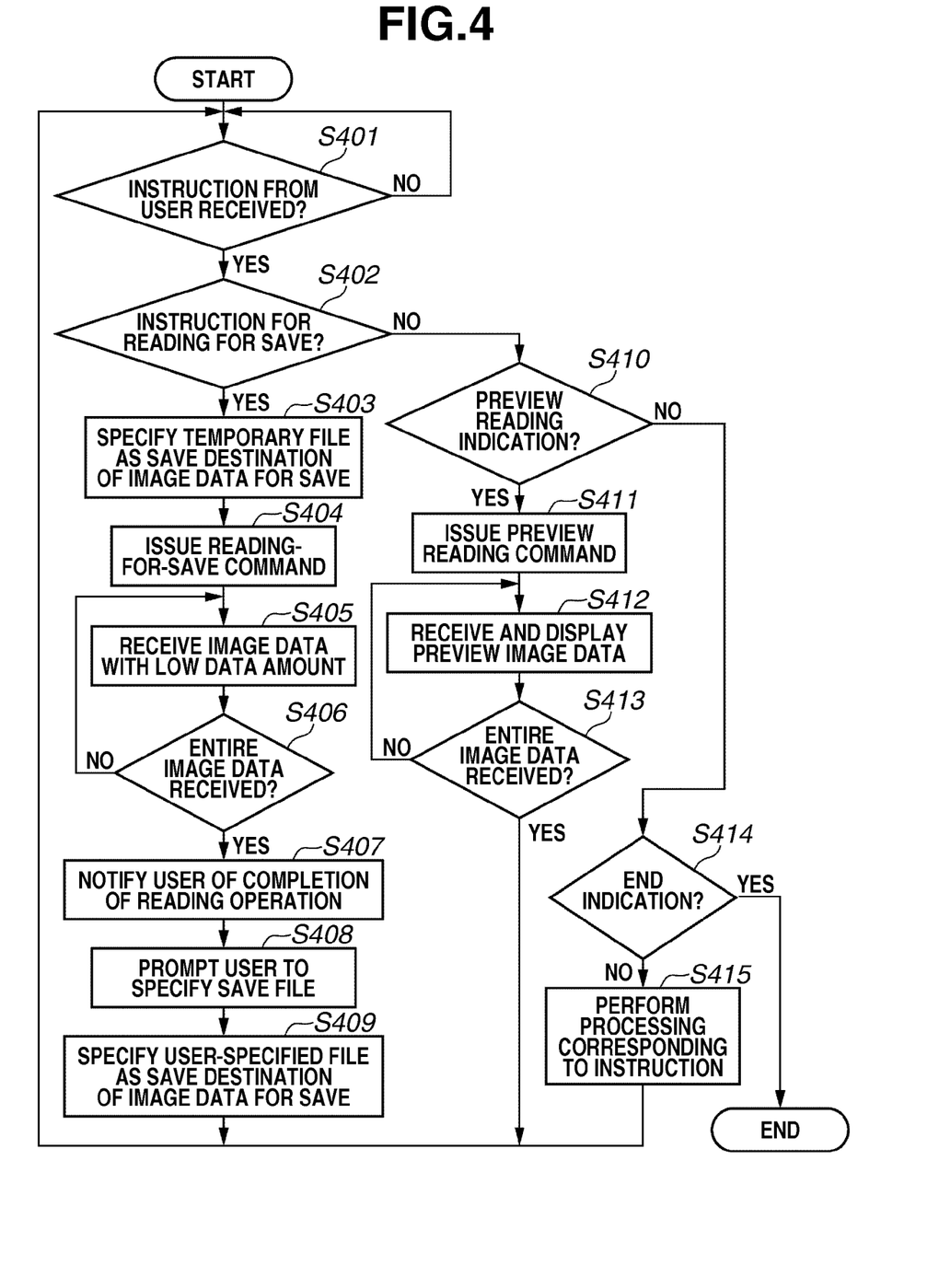
FIG. 4 is a flowchart illustrating processing performed by a driver, which serves as a program having a user interface, which operates on the image processing apparatus, in the first exemplary embodiment.
Figure 5:
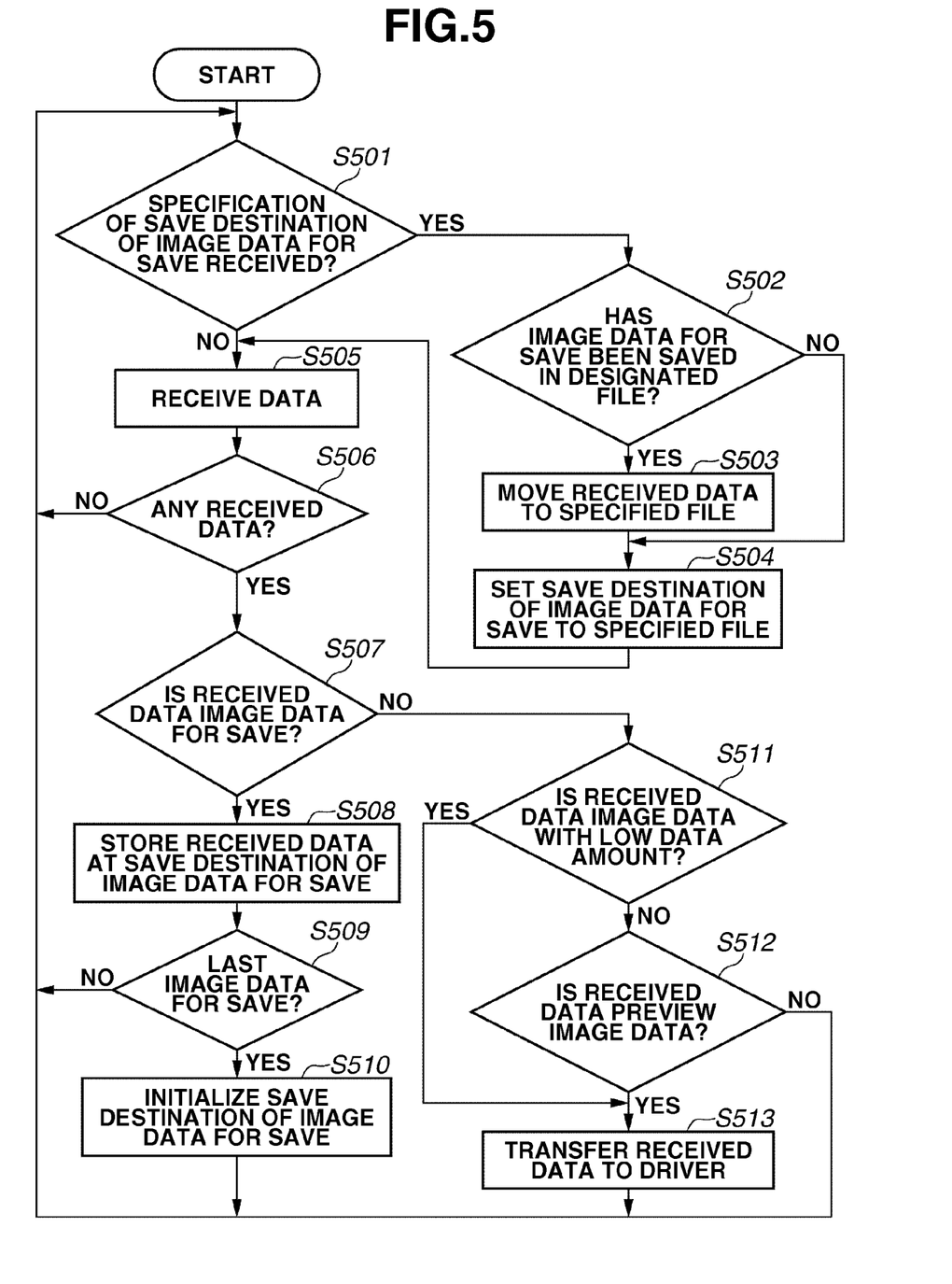
FIG. 5 is a flowchart illustrating processing performed by a resident program that operates on the image processing apparatus according to the first exemplary embodiment.

Next, processing in the first exemplary embodiment will be described in detail. FIG. 4 is a flowchart illustrating processes executed by the driver 301, which is a program having a user interface operable on the image processing apparatus 200 according to the first exemplary embodiment. FIG. 5 is a flowchart illustrating processes executed by the resident program 302, which operates on the image processing apparatus 200 according to the first exemplary embodiment. The processes performed by the first exemplary embodiment on the image processing apparatus 200 are implemented by the cooperative operation of these two programs.

In step S401, the driver 301, which is a program including a user interface that operates on the image processing apparatus 200, displays the result of a preview reading on a preview screen, and then waits for an instruction from a user. If an instruction is received (YES in step S401), and if it is a reading-for-save instruction (YES in step S402), then in step S403, the driver 301 designates a file for saving the read image data-for-save to be a temporary file to the resident program 302. In step S404, the driver 301 issues a reading command to the image reading apparatus 100. The reading command includes the reading range and the reading resolution, which are determined by a user on the driver, and instructions for the image processing to be processed by the image reading apparatus.

Then, in step S405, the driver 301 receives image data with low data amount. After the whole image data with low data amount has been received (YES in step S406), then in step S407, the driver 301 notifies the user of the completion of the reading operation. Since by the reading operation completion notification, the content of the read image can be roughly confirmed, it is suitable to perform the notification by displaying the image data with low data amount as a reading confirmation image on the display unit 205. The reading operation completion notification can be performed by displaying a dialog specifically designed for the reading operation completion notification.

Then, in step S408, the driver 301 prompts a user to designate a save destination of image data-for-save. In step S409, the driver 301 determines a designated file as the save destination for new image data-for-save to the resident program 302. Additionally, in step S403, by executing processing of step S408 as a substitute, the driver 301 can also prompt the user to designate the save file of image data-for-save, before the reading operation by the image reading apparatus 100 starts.

Since the processing in step S408 is performed promptly after step S404, even when the instruction of the save file for the image data-for-save is requested immediately after the reading-for-save instruction is issued, the reading operation can be started before the user's instruction completion, by using the temporary file. Even in this case, making use of a temporary file enables the image reading apparatus 100 to start the reading operation prior to completion of the user's instruction. Further, step S407 can be omitted by performing the reading operation completion notification in step S408.

If the instruction from a user is a preview reading instruction (YES in step S410), then in step S411, the driver 301 issues a preview reading command to the image reading apparatus 100. Then, in steps S412 and S413, the driver 301 receives and displays preview image data. If the instruction from the user is not a preview reading instruction (NO in step S410), then processing continues at step S414. If the instruction from the user is an end instruction (YES in step S414), the processing ends. If the instruction is neither the reading-for-save instruction, the preview reading instruction, nor the end instruction (NO in steps S402, S410, and S414), then in step S415, the driver 301 performs processing corresponding to the instruction. The processing to be performed in step S415 can include a reading range instruction, image adjustment, and various other processing, and step 415 may be implemented using know processing techniques. After each of steps S409, S413, and S415, processing returns to step S401.

As illustrated in FIG. 5, the resident program 302, which operates on the image processing apparatus 200, is a program for receiving data from the image reading apparatus 100. When the image processing apparatus 200 is operating, the resident program 302 is always operating even if the driver 301 is not activated. In step S501, the resident program 302 waits for an instruction of the save destination of the image data-for-save, generally, from the driver 301, and in step S505, waits for a receipt of data from the image reading apparatus.

If the instruction of the save destination of the image data-for-save is received from the driver 301 (YES in step S501), then in step S502, the resident program 302 determines whether the save destination of the image data-for-save has been designated, and whether the image data-for-save has been saved in the designated file. If the image data-for-save has been saved in the designated file (YES in step S502), then in step S503, the resident program 302 causes the received image data-for-save to move to the designated file as a new save destination, and deletes the file saved in the old save destination of the image data-for-save. In step S504, the resident program 302 sets the designated file as a new save destination of the image data-for-save regardless of determination in step S502, and processing proceeds to step S505.

Then, if there is received data (YES in step S506), then in step S507, the resident program 302 determines a type of the data. If the received data is image data with low data amount (YES in step S511) or preview image data (YES in step S512), then in step S513, the resident program 302 transfers the received data to the driver 301. The driver 301 receives transferred data in steps S405 or S412. If the received data is image data-for-save (YES in step S507), then in step S508, the resident program 302 performs necessary image processing, and subsequently stores the received data in a file that the driver 301 has designated in steps S403 and S408. In step S509, based on information added to the image data-for-save, the resident program 302 determines whether the image data-for-save is final data. If the image data-for-save is final data (YES in step S509), then in step S510, the resident program 302 closes the file that is set as the current save destination of the image data-for-save, and resets the save destination of the image data-for-save to be a not-yet-designated status. Since it is enough if the driver 301 determines the completion of transfer of preview image data and image data with low data amount, the resident program 302 does not need to detect the completion of transfer. After each of steps S506, S509, S510, and S513, the processing returns to step S501.

Figure 6:
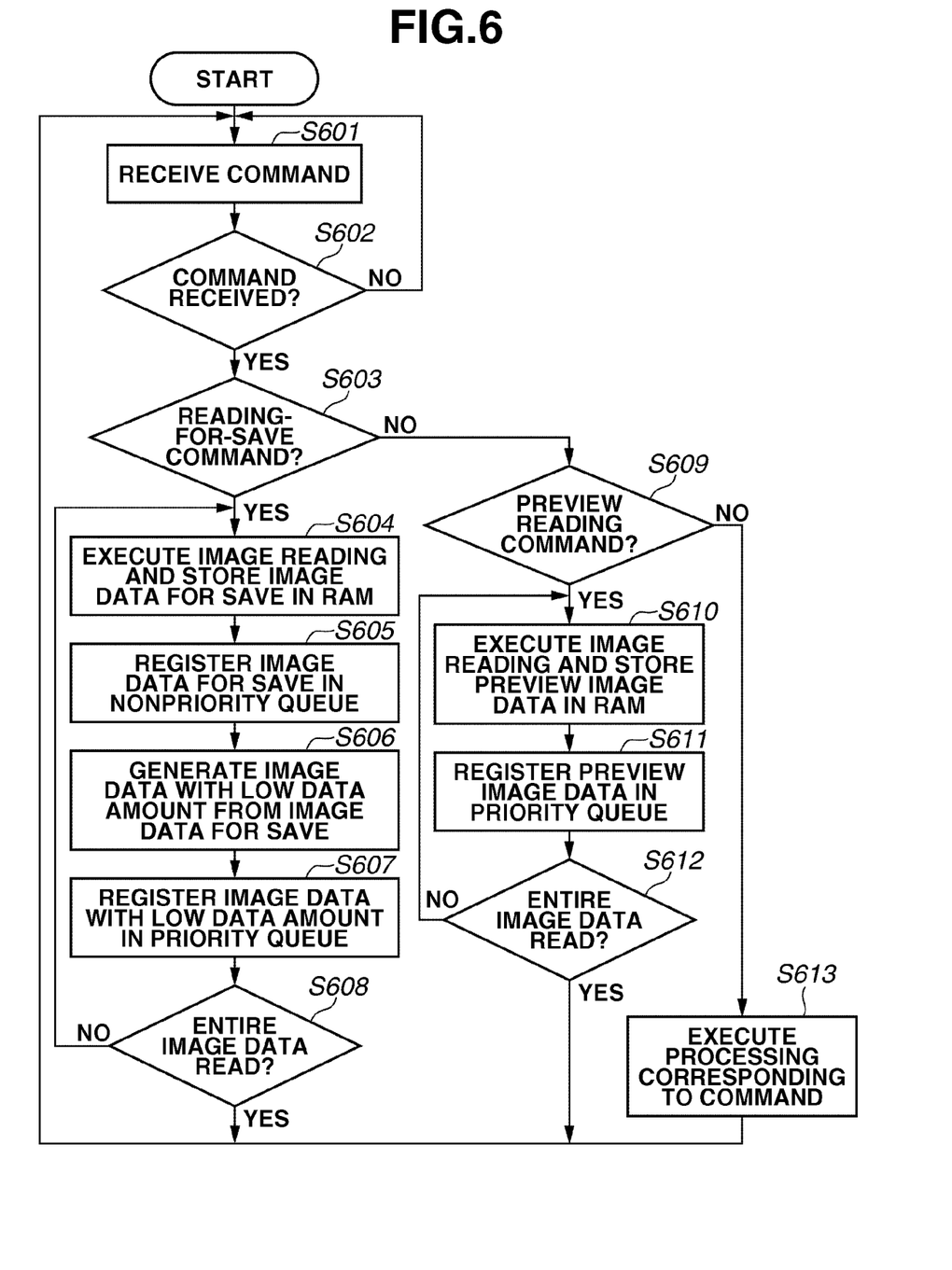
FIG. 6 is a flowchart illustrating processing of a control program that operates on the image reading apparatus according to the first exemplary embodiment.
Figure 7:
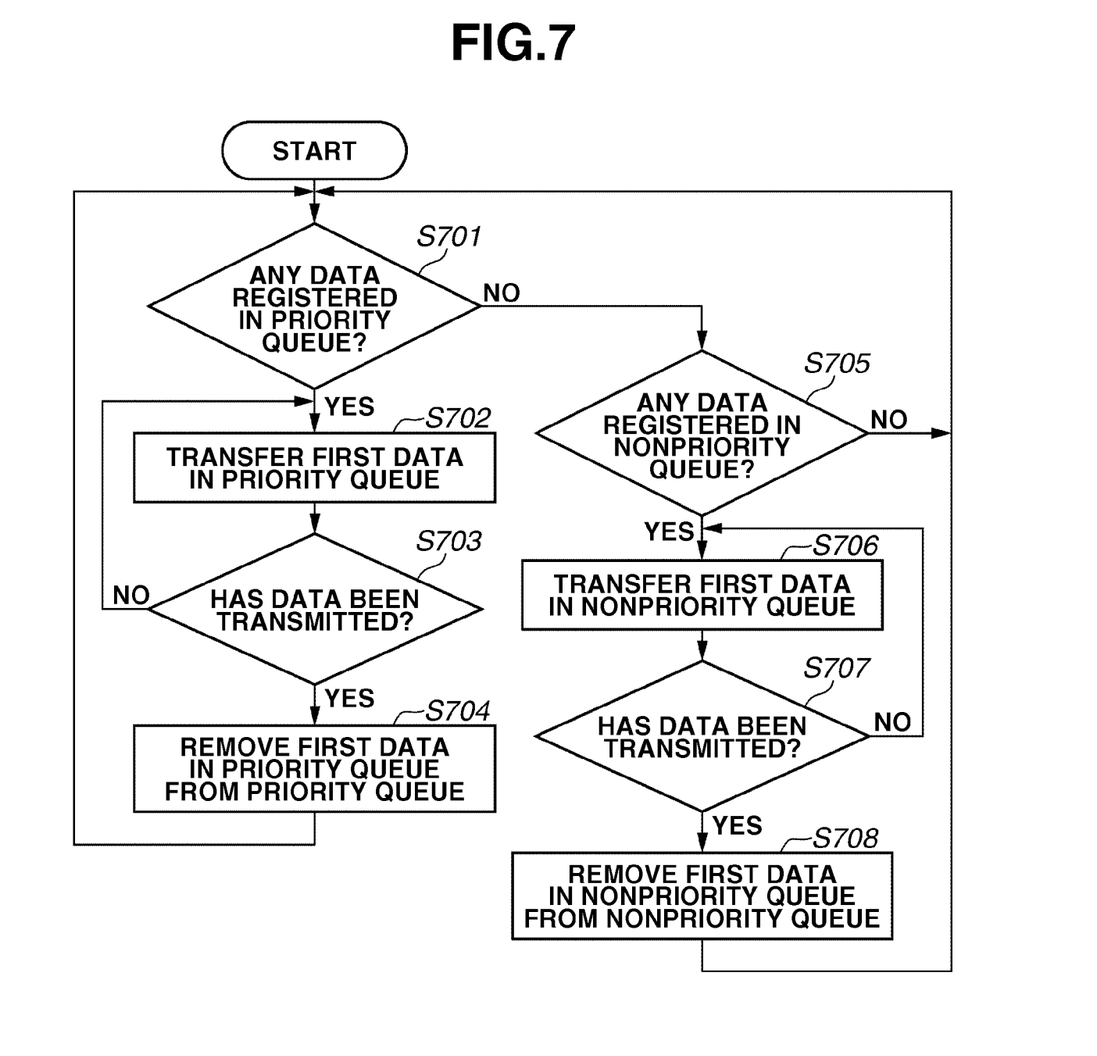
FIG. 7 is a flowchart illustrating processing performed by a communication program that operates on the image reading apparatus.

FIG. 6 is a flowchart illustrating processes of the control program 303, which operates on the image reading apparatus 100, according to the first exemplary embodiment. FIG. 7 is a flowchart illustrating processes of the communication program 304, which operates on the image reading apparatus 100. Processes according to the first exemplary embodiment in the image reading apparatus 100 are performed by cooperative operations of the two programs.

As illustrated in FIG. 6, in steps S601 and S602, the control program 303, which operates on the image reading apparatus 100, waits, in normal state, for a command from the image processing apparatus 200. If a command is received (YES in step S602), and if it is a preview reading command (YES in step S609), then in step S610, the control program 303 executes image reading to acquire preview image data. In step S611, the control program 303 registers the read image data in a priority queue. In step S612, the control program 303 repeats these steps S610, S611 for the whole image, taking an appropriate raster number as a unit, and once the whole image has been read, processing returns to step S601. If the received command is a reading-for-save command (YES in step S603), then in step S604, the control program 303 causes the image reading unit 106 to operate, and executes a reading operation for acquiring the image data-for-save, taking an appropriate raster number as a unit. The control program 303 executes image processing on the read image data-for-save necessary therefor, and subsequently stores the image data-for-save in the RAM 105. Then, in step S605, the control program 303 registers the image data-for-save in a nonpriority queue. In step S606, the control program 303 generates image data with low data amount from the image data-for-save. In step S607, the control program 303 registers the generated image data with low data amount in the priority queue. Here, each of the priority queue and the nonpriority queue is a first-in first-out (FIFO) type queue, and data that has been registered in each queue will be stored in the storage device 107.

On the other hand, queue management data is stored in the RAM 105 or the storage device 107, and is processed by the control program 303 and the communication program 304. In step S608, the control program 303 executes repeatedly processing from step S604 to S607 with respect to the whole image, and upon completion, returns to a status of waiting for a command (S601). Steps S604 to S608 will be completed substantially at the same time as the completion of the operation of the image reading unit 106. The control program 303 adds, to image data to be transmitted, information that enables to discriminate the last image data constituting one image data. The control program 303 may add an identifier for identifying the last image data. Alternatively, total raster numbers are transmitted in advance of transmission of image data, and transmission may be executed by adding information indicating what the ordinal position is in raster numbers, to each image data. If the received command is neither the reading-for-save command nor the preview reading command (NO in steps S603 and S609), then in step S613, the control program 303 executes processing in response to the command. The processes to be executed in step S613 may include adjustment of a light source and various other processes, and step S613 may be implemented using known techniques. After step S613, processing returns to step S601.

As illustrated in FIG. 7, the communication program 304, which operates on the image reading apparatus 100, if any data is registered in the priority queue (YES in step S701), then in step S702, transmits the first data in the priority queue to the image processing apparatus 200. In step S703, the communication program 304 confirms that data has been transmitted without any trouble, and then in step S704, removes the first data from the priority queue. If there is any problem in transmission (NO in step S703), the communication program 304 repeats step S702. Through processes of steps S701 to S704, as long as there is data in the priority queue, data will be transmitted to the image processing apparatus 200. If data is neither registered in the priority queue (NO in step S701) nor in the nonpriority queue (NO in step S705), the processing returns to step S701. If any data is registered in the nonpriority queue (YES in step S705), then in step S706, the communication program 304 transmits the first data in the nonpriority queue to the image processing apparatus 200. In step S707, the communication program 304 confirms that data has been transmitted without any trouble, and then in step S708, the communication program 304 removes the first data from the nonpriority queue. If there is any trouble in transmission (NO in step S707), the communication program 304 repeats step S706. Then, the communication program 304, regardless of whether data remains in the nonpriority queue, returns to step S701. By executing such processing, registered data in the priority queue is transferred earlier than registered data in the nonpriority queue. However, while data in the nonpriority queue is being transmitted, even if data is registered in the priority queue, data in the priority queue cannot be transmitted. The image data-for-save registered in the nonpriority queue is divided into appropriate data amount for reducing a delay of data transfer of the priority queue, and then the divided data is registered.

Also, the communication program 304 is operating while the power source of the image reading apparatus 100 is switched on, and regardless of the state of the image reading apparatus 100, the communication program 304 transmits registered data in the priority queue or in the nonpriority queue to the image processing apparatus 200. Thus, even if the power source of the image reading apparatus 100 is switched off, when not-yet-transferred image data-for-save remains in the queue, transmission of the image data-for-save is started again by the communication program 304 when the power source of the image reading apparatus 100 is switched on again. When communication with the image processing apparatus 200 stops, by some reason such as switching off of the power source of the image processing apparatus 200, while not-yet-transferred image data-for-save remains in the queue, the communication program 304 repeats and executes processes of step S702 or S706 by confirming processes of step S703 and S707. For this reason, if communication is enabled again, the communication program 304 can resume stacked data transmission as if communication had not stopped. In this case, the communication program 304 does not need to discriminate whether transmitted data is preview image data, image data with low data amount, or image data-for-save.

Figure 1A:
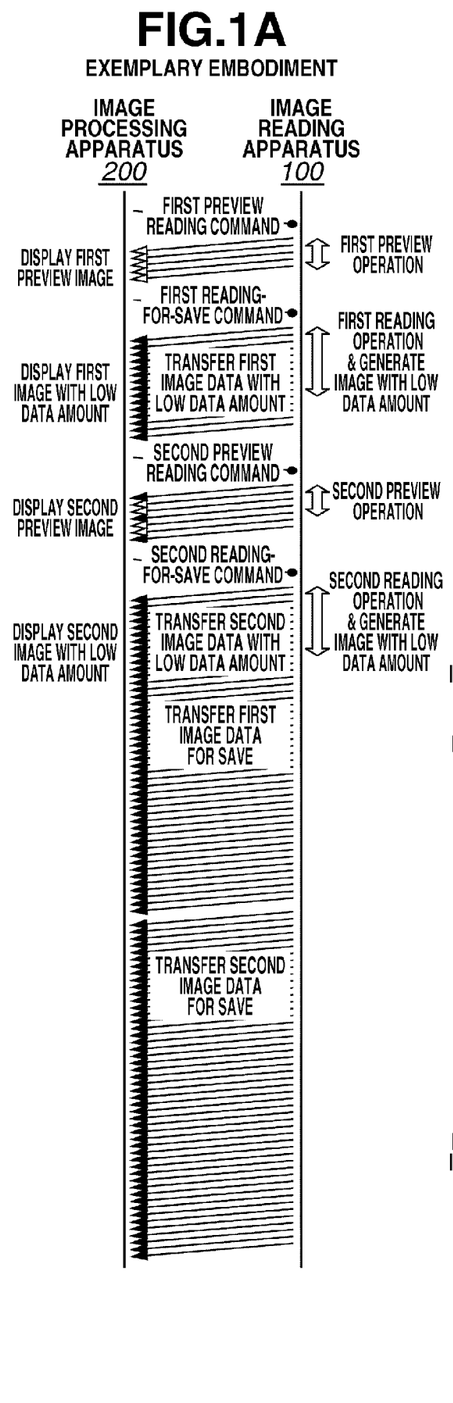
FIGS. 1A and 1B are diagrams illustrating states of data transferring between an image reading apparatus and an image processing apparatus, according to an exemplary embodiment and prior art respectively, when two images are read sequentially.
Figure 1B:
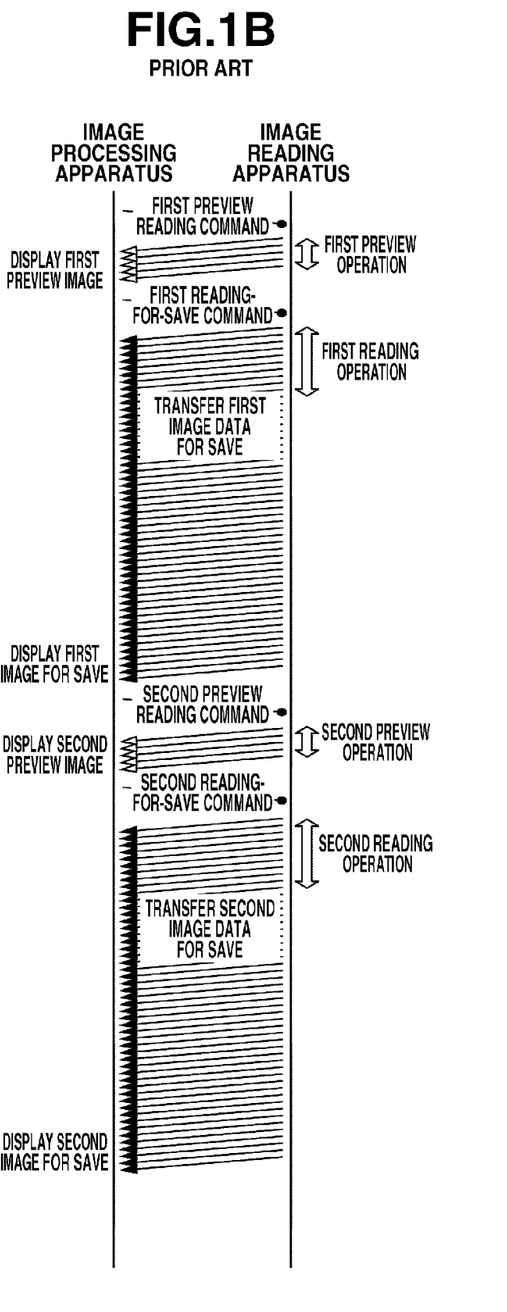

FIGS. 1A and 1B are diagrams illustrating, according to an exemplary embodiment and prior art respectively, states of data transfer between an image reading apparatus and an image processing apparatus, when reading two images sequentially. FIG. 1A is a diagram illustrating a state of data transfer between the image reading apparatus 100 and the image processing apparatus 200, when reading two images sequentially, in the first exemplary embodiment. FIG. 1B is a diagram illustrating a state of data transfer between an image reading apparatus and an image processing apparatus, when reading two images sequentially, in prior art. Lapse of time is represented up to down, the left side refers to an image processing apparatus 200, and the right side refers to an image reading apparatus 100 in each of FIG. 1A and in FIG. 1B. Arrows illustrate that data is transferred in the direction of arrows as illustrated between the image processing apparatus 200 and the image reading apparatus 100, while bars with arrows at both ends, illustrated vertically at right side of the image reading apparatus 100, illustrate time from the start of the reading operation to the completion of the reading operation.

In the first exemplary embodiment as illustrated in FIG. 1A, a time until the completion of transfer of the second image data-for-save is longer than that of the prior art illustrated in FIG. 1B. However, with respect to a time between the first reading command and the second reading command and a time until the second display of the image-for-save, the first exemplary embodiment as illustrated in FIG. 1A is shorter. Therefore, without causing a user to wait, the first exemplary embodiment allows the user to execute a preview and a reading-for-save instruction one after another. According to the first exemplary embodiment, as illustrated above, a reading job for the user is completed at the time when the image-for-save is displayed. As a result, although a time required to actually transfer the image data-for-save can be longer, there are no problems. Although reading of two images will yield a not-so-significant time difference, when much more images are read sequentially, then, it will cause a significant time difference that cannot be neglected.

In the first exemplary embodiment, when a user displays an image with a scaling factor close to 100%, in which one pixel of a display unit 205 corresponds to one pixel of an image-for-save to confirm the image for save, an appropriate image may not be displayed with the image data with low data amount that has been subjected to lossy compression.

Figure 8:
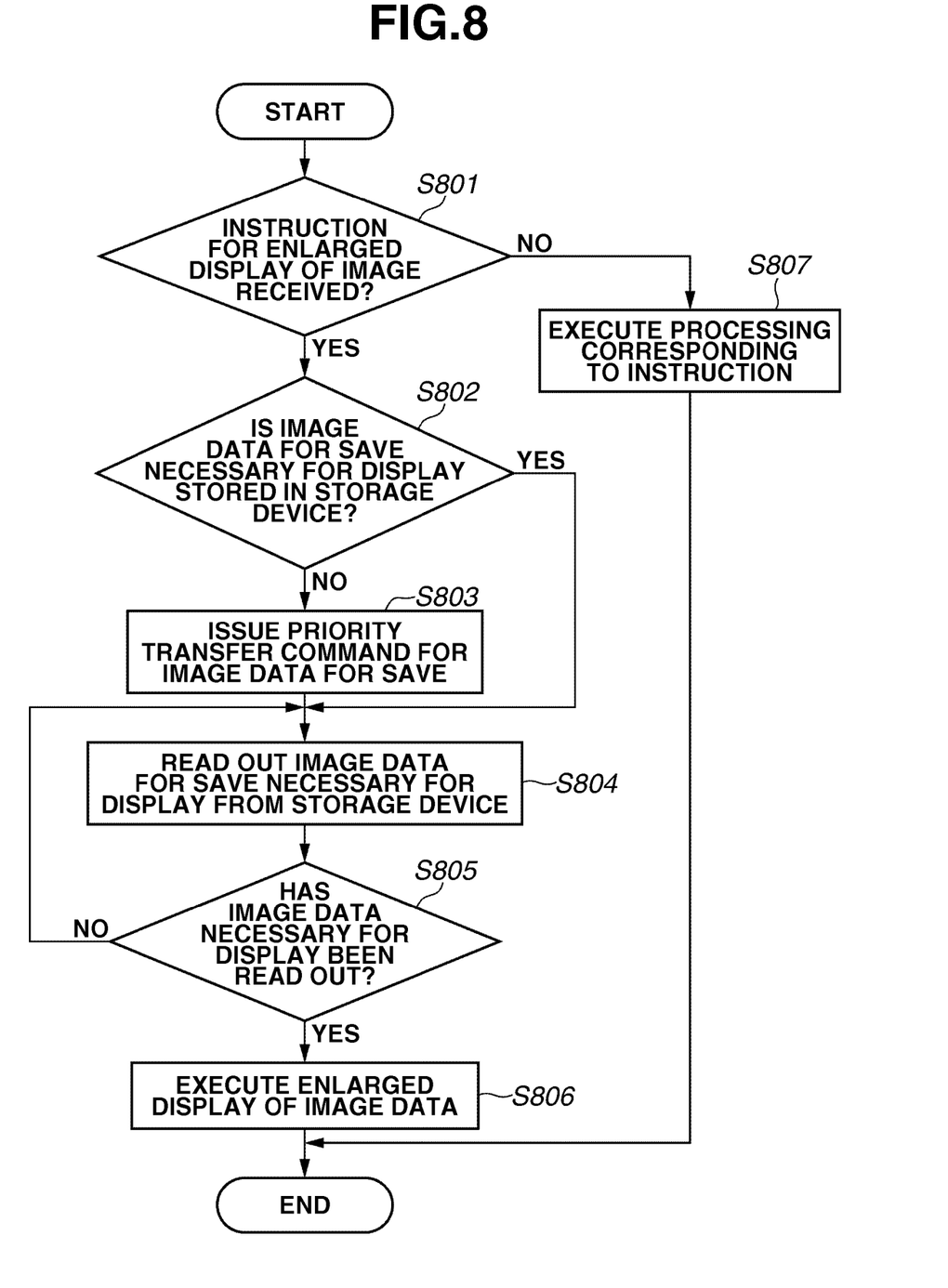
FIG. 8 is a flowchart illustrating processing in which processing as illustrated in step S415 is changed according to a second exemplary embodiment of the present invention.
Figure 9:
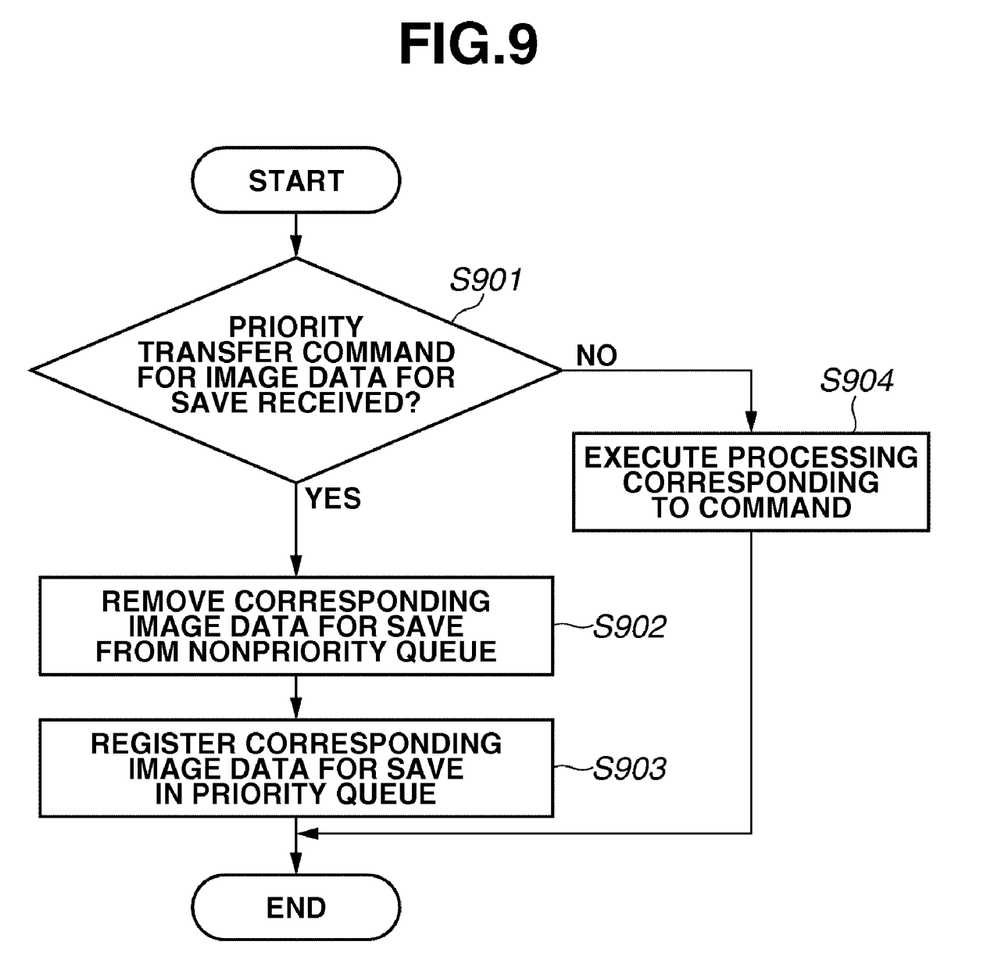
FIG. 9 is a flowchart illustrating processing in which processing in step S613 as illustrated in FIG. 6 is changed according to the second exemplary embodiment.

In a second exemplary embodiment, in addition to the first exemplary embodiment, a configuration, which transfers image data in response to an operation to change a display form of the image data-for-save by a user, is added. This configuration allows a user to confirm an image data-for-save more easily. Processes of the second exemplary embodiment can be performed by changing step S415 executed by the driver 301 and step S613 executed by the control program 303 in the first exemplary embodiment. FIG. 8 is a flowchart illustrating a process in which the processing of step S415 illustrated in FIG. 4 is changed for use in the second exemplary embodiment. FIG. 9 is a flowchart illustrating a process in which the processing of step S613 as illustrated in FIG. 6 is changed for use in the second exemplary embodiment.

The driver 301, which operates on the image processing apparatus 200, displays image data with low data amount as a reading confirmation image on the display unit 205 of the image processing apparatus 200. In FIG. 8, in this state, in step S801, a user issues a display scaling factor instruction to execute enlarged displays with a predetermined scaling factor or more as a display instruction to confirm details of the image. Step S801 is an example of a display scaling factor specifying unit that specifies a display scaling factor of image data. In the display scaling factor instruction, there are two cases, one of which is a case of directly specifying a display scaling factor, and another case is a case, for example, of specifying to display twice as large as a scaling factor of an image previously displayed at 25%, resulting in specifying a display scaling factor of 50%. If the whole enlarged image cannot be displayed, a part of area centering on a portion that a user instructed will be displayed. When the image data-for-save corresponding to the image display area is not stored in the storage device 206 (NO in step S802), then in step S803, the driver 301 issues an image data-for-save priority transfer command, which is a request for priority transfer of corresponding image data-for-save to the storage device 206, with necessary area information added.

In accordance with an image data-for-save priority transfer instruction, the resident program 302 receives, as will be described below, necessary image data-for-save transmitted by the control program 303 and the communication program 304 (steps S501, S505, S506). Then, the resident program 302 stores the received data in the save area for the image data-for-save (steps S507 to S510). In steps S804 and S805, the driver 301 reads out the image data-for-save corresponding to the image display area from the save area of the image data-for-save of the storage device 206, and then in step S806, the driver 301 displays the image data-for-save on the display unit 205. If the instruction from a user is not to display an image by enlarging it with a predetermined scaling factor or more (NO in step S801), then in step S807, the driver 301 executes processing corresponding to the instruction. Similar to step S415, processing executed in step S807 may be implement using known techniques.

As illustrated in FIG. 9, the control program 303, which operates on the image reading apparatus 100, determines, in step S901, whether the received command is an image data-for-save priority transfer command. If the received command is the image data-for-save priority transfer instruction (YES in step S901), then in step S902, the control program 303 removes corresponding image data-for-save from the nonpriority queue, according to the area information added to the image data-for-save priority transfer command, from the image data-for-save stored as data of the nonpriority queue in the storage device 107. Then, in step S903, the control program 303 registers the corresponding image data-for-save in the priority queue. If the received command is not the image data-for-save priority transfer command (NO in step S901), then in step S904, the control program 303 executes processing corresponding to the command. Similar to step S613, processing of step S904 may be implemented using known techniques.

Thus, the data transferred for the enlarged display is identical to the image data-for-save, but when images are displayed on the display unit 205, in most of cases they are displayed in a rectangular shape having 300 to 500 pixels for each side. Since the data amount is, even for high-quality for save, less than 1 M bytes, data can be transferred in a low-rate communication channel without causing users to wait so long. Image data that has been transferred in such a manner is, as described above, stored in the storage device 206 as image data-for-save. By performing processing like this, needless duplication of transmitting the same image data can be prevented.

In the second exemplary embodiment, it is useful that a temporary file specified as a save destination of the image data-for-save in step S403 is of a type that can partially save and manage image data, rather than ordinary image file formats, such as Joint Photographic Experts Group (JPEG), Tag Image File Format (TIFF), Portable Network Graphics (PNG). Then, when all image data-for-save has been received, and subsequently when data is moved from a temporary save destination of the image data-for-save to a save destination of the image data-for-save specified by a user, transforming data into a common image file format is most desirable. Also, processing in the second exemplary embodiment can be efficiently performed by setting a transfer unit for transferring the image data-for-save to be a rectangular block with a predetermined number of pixels, e.g., 256×256. Additionally, when the completion of transfer of the image data-for-save in step S509 of the resident program 302 is determined, it is efficient that the determination is based on whether data of the whole image has been transferred.

In a third exemplary embodiment of the present invention, the data amount of image data-for-save is determined, and if the data amount is equal to or greater than a predetermined data amount, processing in the first exemplary embodiment or the second exemplary embodiment is executed. However, if the data amount is less than the predetermined data amount, processing is executed in a conventional manner. Even before actually performing a reading operation, based on a reading range, resolution, and bit number per pixel, outline of data amount of the image data-for-save can be estimated. Accordingly, it is possible to determine, before a reading operation, whether the estimated data amount of the read-image calculated based on the reading range, resolution, and bit number per pixel is equal to or greater than a predetermined reference value. If the estimated data amount of the read image is less than the predetermined reference value, a time required to transfer the image data is estimated to be short, and consequently there is no need for processing using the image data with low data amount. Based on the determination, it is possible to switch between processing according to the first or second exemplary embodiments and conventional processing. In conventional processing, processing using the image data with low data amount is not executed, but a user is notified that read-out of the next document is possible, upon completion of transfer of the image data-for-save, and waits for a reading instruction. In addition, it would be more optimal if the reference value for switching is determined based on the connection method between the image reading apparatus 100 and the image processing apparatus 200 or the results of actual measurement of effective transfer rate.

According to the above-mentioned exemplary embodiments, even if transfer of the image data-for-save is not completed, by the notification made substantially at the same as the reading operation, a user can recognize that the next reading instruction can be made, and thus can make the next reading instruction without any doubt. For this reason, even if the image reading apparatus and the image processing apparatus communicate with each other in the connection form with low data transfer rate, a waiting time of a user can be minimized, in particular, when a plurality of images are read sequentially. In such a case, an operation time can be significantly reduced, and usability of a user can be improved. Also, a user operation and time-consuming transfer of the image data-for-save are separated from each other, so that a user does not need to perform operations for starting of transfer and resuming after interruption, and probability of feeling unstableness by users decreases even in environments where communication is unstable. Such unstable communication may be due, for example, to problems with a wireless LAN or other communication device or protocol. Further, a program that replaces the respective units with steps and causes an image processing apparatus to execute these steps is also an embodiment of the present invention. Yet further, a computer-readable storage medium storing program code for implementing the present invention is also an embodiment of the present invention. In this case, the program may be stored in computer-readable storage media, such as compact disc (CD), digital versatile disc (DVD), hard disk (HD), or semiconductor memory, for example.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-017081 filed Jan. 29, 2008, which is hereby incorporated by reference herein in its entirety.

What is claimed is:

1. An image reading system comprising:
   an image reading apparatus configured to read a document at a second resolution according to an instruction by a user based on a result of reading the document at a first resolution, wherein the image reading apparatus includes:
   a read image data storage unit configured to store image data that is read at the second resolution as image data-for-save according to the instruction by the user based on the result of reading the document at the first resolution,
   a calculation unit configured to calculate an estimated read-image data amount according to conditions set by the user based on the result of reading the document at the first resolution,
   a generation unit configured to generate, from the image data-for-save, image data with low data amount having smaller data amount than the image data-for-save, and
   a transfer unit configured to transfer the image data with low data amount with priority over the image data-for-save to an image processing apparatus; and
   the image processing apparatus, wherein the image processing apparatus includes:
   a determination unit configured to determine a type of the image data transferred by the image reading apparatus,
   a notification unit configured to notify the user, before completing reception of the image data-for-save, that operations of the image reading apparatus are completed and a reading instruction is acceptable, in response to the determination unit determining that the type of the transferred image data is the image data with low data amount, and
   an image data-for-save storage unit configured to store the transferred image data-for-save in a storage area of the image processing apparatus, in response to the determination unit determining that the type of the transferred image data is the image data-for-save,
   wherein, in response to the estimated read-image data amount that has been calculated being less than a predetermined reference value, the generation unit does not generate the image data with low data amount, and
   wherein, in response to the transfer of the image data-for-save being completed, the notification unit notifies the user that the reading instruction is acceptable.

2. The image reading system according to claim 1, wherein the notification that the reading instruction is acceptable is to display the image data with low data amount.

3. The image reading system according to claim 1, wherein the notification that the reading instruction is acceptable is to display a save destination specifying dialog for the image data-for-save.

4. The image reading system according to claim 1, wherein the image data with low data amount is image data that has been compressed using Joint Photographic Experts Group (JPEG) compression.

5. A non-transitory computer-readable storage medium storing a program for controlling an image reading system having an image reading apparatus configured to read a document at a second resolution according to an instruction by a user based on a result of reading the document at a first resolution and an image processing apparatus, the program comprising:
   storing, in the image reading apparatus, image data that is read at the second resolution as image data-for-save according to the instruction by the user based on the result of reading the document at the first resolution;
   calculating, in the image reading apparatus, estimated read-image data amount according to conditions set by the user based on the result of reading the document at the first resolution;
   generating, in the image reading apparatus, from the image data-for-save, image data with low data amount having smaller data amount than the image data-for-save;
   transferring, from the image reading apparatus, the image data with low data amount with priority over the image data-for-save to the image processing apparatus;
   determining, in the image processing apparatus, a type of the image data transferred by the image reading apparatus;
   notifying the user, from the image processing apparatus and before completing reception of the image data-for-save, that operations of the image reading apparatus are completed and a reading instruction is acceptable, in response to determining that the type of the transferred image data is the image data with low data amount; and
   storing, in the image processing apparatus, the transferred image data-for-save in a storage area of the image processing apparatus, in response to determining that the type of the transferred image data is the image data-for-save,
   wherein, in response to the estimated read-image data amount that has been calculated being less than a predetermined reference value, generating includes not generating the image data with low data amount, and
   wherein, in response to the transfer of the image data-for-save being completed, notifying includes notifying the user that the reading instruction is acceptable.

6. An image reading apparatus connected to an image processing apparatus and configured to read a document at a second resolution according to an instruction by a user based on a result of reading the document at a first resolution, the image reading apparatus comprising:

a read image data storage unit configured to store image data that is read at the second resolution as image data-for-save according to the instruction by the user based on the result of reading the document at the first resolution;

a calculation unit configured to calculate an estimated read-image data amount according to conditions set by the user based on the result of reading the document at the first resolution;

a generation unit configured to generate, from the image data-for-save, image data with low data amount having smaller data amount than the image data-for-save; and a transfer unit configured to transfer the image data with low data amount with priority over the image data-for-save to the image processing apparatus, wherein, in response to the estimated read-image data amount that has been calculated being less than a predetermined reference value, the generation unit does not generate the image data with low data amount, and the transfer unit transfers the image data-for-save to the image processing apparatus.

7. An image reading method for an image reading apparatus configured to read a document at a second resolution according to an instruction by a user based on a result of reading the document at a first resolution, and an image processing apparatus, the image reading method comprising:

storing, in the image reading apparatus, image data that is read at the second resolution as image data-for-save;

calculating, in the image reading apparatus, an estimated read-image data amount according to conditions set by the user based on the result of reading the document at the first resolution;

generating, in the image reading apparatus and from the image data-for-save, image data with low data amount having smaller data amount than the image data-for-save;

transferring, from the image reading apparatus, the image data with low data amount with priority over the image data-for-save to the image processing apparatus;

determining, in the image processing apparatus, a type of the image data transferred by the image reading apparatus;

notifying the user, from the image processing apparatus and before completing reception of the image data-for-save, that operations of the image reading apparatus are completed and a reading instruction is acceptable, in response to determining that the type of the transferred image data is the image data with low data amount; and storing the transferred image data-for-save in a storage area of the image processing apparatus, in response to determining that the type of the transferred image data is the image data-for-save, wherein, in response to the estimated read-image data amount that has been calculated being less than a predetermined reference value, the image data with low data amount is not generated, and the image data-for-save is transferred to the image processing apparatus.

8. The image reading system according to claim 1, wherein the generating unit further is configured to generate, from the image data-for-save, image data with low data amount having smaller data amount than the image data-for-save based on a data transfer speed between the image reading apparatus and the image processing apparatus.

9. The non-transitory computer-readable storage medium according to claim 8, wherein generating, from the image data-for-save, image data with low data amount having smaller data amount than the image data-for-save is based on a data transfer speed between the image reading apparatus and the image processing apparatus.

10. The image reading method according to claim 7, wherein generating, from the image data-for-save, image data with low data amount having smaller data amount than the image data-for-save is based on a data transfer speed between the image reading apparatus and the image processing apparatus.

* * * * *